United States Patent [19]

Exner et al.

[11] 4,185,505
[45] Jan. 29, 1980

[54] APPARATUS FOR MEASURING THE PRE-TENSION OF A THREADED BOLT

[75] Inventors: Gerhard Exner; Volfango Festinori; Detlef Luckschus, all of Berlin, Fed. Rep. of Germany

[73] Assignee: Kraftwerk Union Aktiengesellschaft, Mulheim, Fed. Rep. of Germany

[21] Appl. No.: 954,849

[22] Filed: Oct. 26, 1978

[30] Foreign Application Priority Data

Nov. 3, 1977 [DE] Fed. Rep. of Germany ....... 2749537

[51] Int. Cl.² ............................................. G01L 5/24
[52] U.S. Cl. ..................................... 73/761; 81/57.38
[58] Field of Search .................................. 73/761, 847; 116/DIG. 34; 81/52.4 R, 52.4 A, 52.4 B, 57.38; 85/62, 1 T

[56] References Cited

U.S. PATENT DOCUMENTS

| | | | |
|---|---|---|---|
| 2,562,831 | 7/1951 | Stone | 73/761 X |
| 2,995,033 | 8/1961 | Stifano, Jr. | 73/761 |
| 3,162,071 | 12/1964 | Biach | 81/57.38 |
| 3,837,694 | 9/1974 | Frisch et al. | 85/1 T |
| 3,877,326 | 4/1975 | Köck et al. | 81/57.38 |
| 3,943,819 | 3/1976 | Charron | 73/761 X |
| 3,995,828 | 12/1976 | Orban | 81/57.38 X |

FOREIGN PATENT DOCUMENTS

2604510 8/1977 Fed. Rep. of Germany ............. 73/761

Primary Examiner—Gerald Goldberg
Assistant Examiner—Joseph W. Roskos
Attorney, Agent, or Firm—Kenyon & Kenyon

[57] ABSTRACT

Apparatus for measuring the pre-tension of a threaded bolt which is elongated by means of a tensioning unit and a screwed-in tensioning bolt; a measuring rod is inserted into a central hole in the threaded bolt and the difference in length is determined by means of a length measuring device.

The measuring rod is guided in the housing of the tensioning unit, secured against rotation, and is threaded to engage a threaded bushing. The threaded bushing is longitudinally movable and secured against rotation in a bushing having external teeth. Rotation of the tensioning bolt is transmitted via gears to the threads on the measuring rod and converted into an up or down movement. The measurement may be made when the measuring rod comes to rest at the lowest point of the central hole.

8 Claims, 1 Drawing Figure

APPARATUS FOR MEASURING THE PRE-TENSION OF A THREADED BOLT

BACKGROUND OF THE INVENTION

This invention relates to an apparatus for measuring the pre-tension of a threaded bolt serving, for example for closing a reactor pressure vessel. In such an apparatus a tensioning bolt is turned by a superposed automatic tightening unit in which the threaded bolt is elongated by means of a tensioning unit. The tensioning unit contains a measuring rod introduced into a central hole in the threaded bolt and in the tensioning bolt, as well as a length measuring device which determines the length difference between the threaded bolt, including the tensioning bolt, if applicable, and the measuring rod.

Such a measuring apparatus is described in U.S. Pat. No. 3,837,694. There, both the threaded bolt used for closing reactor barrels and pressure vessels and the tensioning bolt screwed into it to apply the pre-tension contain central bores forming a passage which extends to the head of the threaded bolt. A measuring rod is introduced into this hole and is screwed in at its lowest point. When the threaded bolt is pre-tensioned by means of the tensioning bolt, the measuring rod in the hole remains unstressed and the pre-tension of the threaded bolt is determined by measuring the difference in length between the inserted measuring rod and the threaded bolt, including the tensioning bolt, by means of a length measuring device, such as a dial indicator.

In the above apparatus, the measuring rods used for measuring the pre-tension are always inserted by hand into the holes of the threaded bolts with tensioning bolts and are then screwed in tight, an operation which requires a relatively long time, especially since they must be removed again after the measurement. It is an object of the present invention to utilize the rotary motion required for screwing the tensioning rod into and out of the threaded bolt at the same time for inserting the measuring rod into the threaded bolt, and for removing it.

BRIEF DESCRIPTION OF THE INVENTION

In accordance with the present invention, this problem is solved in a measuring arrangement of the type described above, by providing a measuring rod having a longitudinal slot at its upper end in which a key runs. The key is fastened to the housing of the tensioning unit via a yoke and is secured against rotation. The measuring rod is threaded in the vicinity of the tensioning unit and engages a threaded bushing disposed for limited longitudinal motion, but secure against rotation, in a bushing having external gear teeth. Gears, which also engage internal gearing connected to the tensioning bolt, mesh with the external teeth of the bushing. The shafts of the gears are supported, secured against rotation, on the measuring rod. The measuring rod in addition, carries the length measuring device which also contacts or rests on a surface of the tensioning bolt or of the threaded bolt.

The measuring rod is inserted into the threaded bolt until it comes to rest at the bottom of the bore hole. The length difference occurring upon elongation is measured with reference to the unstressed measuring rod by bringing the length measuring equipment fastened to the rod to a stop against a surface of the tensioning bolt or the threaded bolt.

In the illustrative embodiment of the measuring apparatus, the measuring rod is secured against rotation, by means of the yoke on the tightening unit housing and is transported along with the associated tensioning bolt and placed on the respective threaded bolt. The rotations of the tensioning rod for screwing it into and out of the threaded bolt of the reactor pressure vessel are transmitted to it from the interal gearing connected to the bolt and the gears meshing with it, via a threaded bushing which engages the threaded measuring rod and, because the latter cannot rotate, displaces it in the lengthwise direction. Thus, the rotary motion of the tensioning bolt is transformed into an up or down motion of the measuring rod. After the measurement has been made, the measuring rod is lifted off again together with the tensioning device, so that the bore hole of the threaded bolt is free for nondestructive material inspections which are part of normal maintenance.

So that the screw-in lengths of the tensioning bolt and of the measuring rod can be chosen independently of each other, it is advantageous to use two sets of gears for transmitting the rotary motion; each set comprises two gears of different diameter arranged on a shaft. One gear meshes with the internal gearing, and the other meshes with the bushing having the external teeth. Thereby, a transmission ratio corresponding to the length difference of the screw joints can be obtained.

To compensate for variations in length, the bushing with external teeth is provided with elongated holes in which projections of the threaded bushing are longitudinally movable. The threaded bushing can therefore be displaced in the longitudinal direction to a limited extent relative to the toothed bushing.

DETAILED DESCRIPTION OF THE INVENTION

Figure 1:
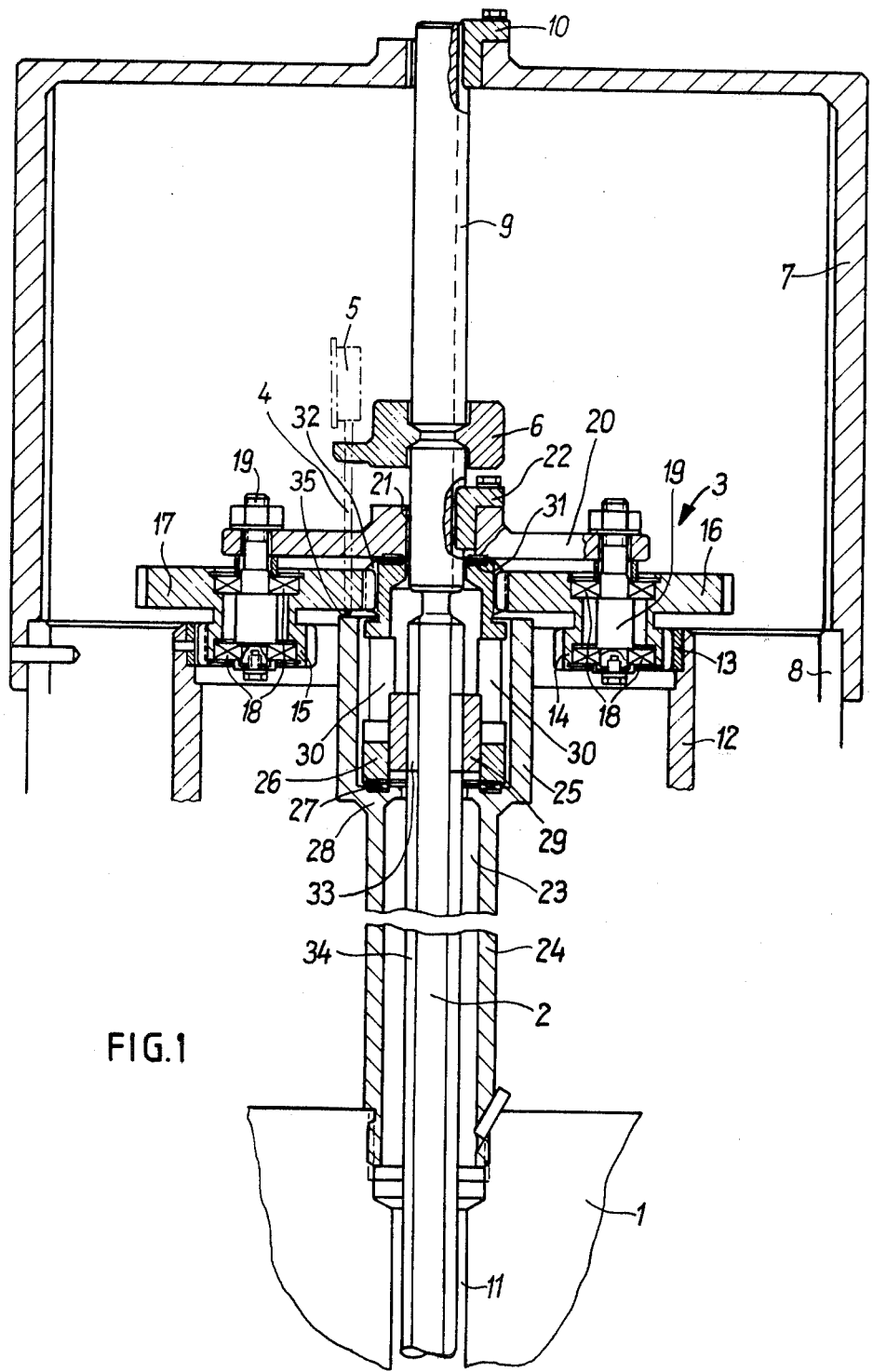
FIG. 1 is a side view, in partial cross section, of a measuring apparatus enbodying the teachings of the invention.

In order to counteract leaks which are possible at the expected internal pressure of a reactor pressure vessel, the threaded bolts which close the vessel are put under a predetermined pre-tension. This pre-tension is produced by elongating the threaded bolts by means of portable, automatic tensioning units superposed on a tensioning bolt 1 (FIG. 1) which is screwed into the threaded bolt (not shown). Elongation of the threaded bolt plus the tensioning bolt is measured in order to obtain the specified pre-tension. For this purpose, a measuring rod 2 is used which interacts with a measuring apparatus 3 containing a length measuring device 4 and an optical indicating device 5. This length measuring device 4 is fastened to the measuring rod 2 by means of the clamp 6.

The measuring apparatus 3 with the measuring rod 2 is fastened to the housing 8 of the tightening unit, of which only part is shown, by means of the yoke 7. The measuring rod 2 has a longitudinal slot 9 in its upper part into which the fitted key 10 connected to the yoke 7 extends, so that the measuring rod 2 is secured against rotation. The lower end of the measuring rod 2 goes through a central hole 11 in the tensioning bolt 1 and a corresponding central hole in the threaded bolt which extends to the head of the threaded bolt (not shown). There, the lower end of the measuring rod 2 is brought to a stop. After the tensioning unit has been placed on the threaded bolt, the rotary motion of the tensioning bolt 1 is utilized for inserting the measuring rod wherein the tensioning bolt is screwed into the threaded bolt. To this end, the tensioning bolt 1 is connected to a sleeve 12 which has on the inside at its upper end a ring 13 having internal teeth meshing with gears 14 and 15. Gears 14 and 15 are coupled to larger diameter gears 16 and 17, respectively, each assembly being mounted on antifriction bearings 18 and carried on vertical shafts or spindles 19. Shafts 19 are fastened in a plate 20 through which rod 2 passes. Plate 20 is, in addition, connected to the key 22 which engages the longitudinal slot 9 of the measuring rod 2, so that the plate 20 can move longitudinally on the measuring rod 2 while being secured thereby against rotation.

The measuring rod 2 also passes through the interior 23 of a tube 24 which is screwed into the tensioning bolt 1. At its upper end, the tube 24 is enlarged to form an extension 25 of larger diameter. A slotted bushing 26 is contained within extension 25 and is supported on the bottom 28 of the extension 25 by antifriction bearing 27. The bushing 26 sustains the threaded bushing 29 which can move up and down in two elongated holes or slots 30, but must otherwise follow the motions of the bushing 26, especially its rotation. The plate 20 rests and is supported on the upper end face of the bushing 26 by the antifriction bearing 31.

At its upper end, the slotted bushing 26 is provided with external gearing 32 which meshes with the two gears 16 and 17. In this manner, the rotation of the sleeve 12 of the tensioning bolt 1 is transmitted via the gears 14, 15, 16, 17 and the slotted bushing 26 to the threaded bushing 29. The internal thread 33 of the threaded bushing 29 engages a corresponding thread 34, preferably of a trapezoidal character, on the measuring rod 2. Because the measuring rod 2 is secured against turning, rotation of the threaded bushing 29 causes an up or down motion of the measuring rod 2, depending on the direction of rotation. The gear ratios of the gears 14, 16 and 15, 17, respectively, and the dimensions of the elongated holes 30 are chosen so that rotation of the tensioning bolt 1 as it is being screwed into the threaded bolt causes a sufficient downward movement of the measuring rod to bring it to a stop in the threaded bolt at the bottom of the central hole.

When the threaded bolt is elongated by means of the tensioning unit acting on the tensioning bolt, the threaded bolt displaces the tensioning bolt 1 and the tube 24 relative to the unstressed measuring rod 2. Since, at completion of the screwing-in operation in which the measuring rod 2 had reached the bottom of the hole in the threaded bolt, the length measuring device 4 was brought to a stop on the upper end face 35 of the tube 24, the elongation of the threaded bolt and, therefore, its pre-tension can be read at the optical indicator 5 of the length measuring device 4.

After the reactor pressure vessel is closed, unscrewing the tensioning bolt also moves the measuring rod 2 upward out of the threaded bolt, detaching it and permitting it to be lifted off together with the tensioning unit.

If the threaded bolt alone is to be utilized for the elongation measurement, then the extension tube 24 can be screwed directly into the threaded bolt. In this case its central passage communicates with a central hole in the threaded bolt like that in the tensioning bolt 1.

What is claimed is:

1. In an apparatus for measuring the pre-tension of a threaded bolt useful for closing a reactor pressure vessel comprising a demountable automatic tensioning unit having a tensioning bolt for screwing into a threaded bolt and elongating it, there being a central hole in the tensioning bolt and in the threaded bolt for receiving a measuring rod and a measuring device for determining the difference in length between the threaded bolt plus the tensioning bolt and the measuring rod, the improvement comprising:

a tensioning unit housing adapted to engage the tensioning bolt and including a yoke provided with an opening having a fitted key, a measuring rod passing through the yoke opening and having at its upper end a longitudinal slot for receiving the fitted key and securing the rod against rotation, and further having in the vicinity of the tensioning unit a threaded portion for engaging a threaded bushing, a threaded bushing for engaging the threaded rod, a hollow bushing for containing the threading bushing and securing it against rotation while permitting limited longitudinal motion relative to the rod, internal gearing connected to the tensioning bolt, intermediate gears mounted on spindles carried, secure against rotation, by the measuring rod for meshing with the external teeth of the hollow bushing and the internal gearing connected to the tensioning bolt, and a length measuring device carried by the measuring rod and resting on a surface connected to the tensioning bolt or the threaded bolt.

2. In an apparatus in accordance with claim 1, the further improvement that the intermediate gears such consist of two gears of differing diameters mounted on a shaft with a gear of one diameter meshing with the external teeth of the bushing and a gear of the other diameter meshing with the internal gearing connected to the tensioning bolt.

3. In an apparatus in accordance with claim 2, the improvement in which the bushing having external gear teeth is provided with elongated holes in which the threaded bushing is longitudinally movable.

4. In an apparatus in accordance with claim 1 or claim 3, the improvement in which the bushing having external gear teeth is carried on an end face of a tube connected to the tensioning bolt and surrounding the measuring rod 5. In apparatus in accordance with claim 1 or claim 2, the improvement in which the spindles carrying the intermediate gears are supported by a plate having a hole for passage of the measuring rod and having a key for engaging the longitudinal slot in the measuring rod and securing the plate against rotation.

6. In an apparatus in accordance with claim 5, the improvement in which the plate is supported on an upper end face of the bushing having external gear teeth.

7. In an apparatus in accordance with claim 5, the improvement in which the intermediate gears are carried on upright spindless.

8. In an apparatus according to claim 1, the improvement in which the thread on the measuring rod and the thread of the threaded bushing are trapezoidal in profile.

* * * * *